United States Patent
Jin et al.

(10) Patent No.: US 11,070,056 B1
(45) Date of Patent: Jul. 20, 2021

(54) SHORT-TERM INTERVAL PREDICTION METHOD FOR PHOTOVOLTAIC POWER OUTPUT

(71) Applicant: DALIAN UNIVERSITY OF TECHNOLOGY, Liaoning (CN)

(72) Inventors: Feng Jin, Liaoning (CN); Jun Zhao, Liaoning (CN); Xingxing Gao, Liaoning (CN); Linqing Wang, Liaoning (CN); Wei Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/197,831

(22) Filed: Mar. 10, 2021

(30) Foreign Application Priority Data

Mar. 13, 2020 (CN) .......................... 202010173047.3

(51) Int. Cl.
*H02J 3/00* (2006.01)
*G06F 17/18* (2006.01)
*G06F 17/16* (2006.01)

(52) U.S. Cl.
CPC .............. *H02J 3/004* (2020.01); *G06F 17/16* (2013.01); *G06F 17/18* (2013.01); *H02J 2300/24* (2020.01)

(58) Field of Classification Search
CPC ........ G06F 17/18; H02J 3/004; H02J 2300/24
See application file for complete search history.

(56) References Cited

U.S. PATENT DOCUMENTS 9,597,975 B2 * 3/2017 Ito ...................... B60L 11/1844
2013/0054662 A1 * 2/2013 Coimbra ................. G06F 17/18
708/230

(Continued)

FOREIGN PATENT DOCUMENTS

| CN | 103310065 A | 9/2013 |
| CN | 108717579 A | 10/2018 |
| CN | 110110912 A | 8/2019 |

OTHER PUBLICATIONS

Search Report generated Sep. 18, 2020 in corresponding CN Application 202010173047.3, with English translation, 2 pages.

(Continued)

*Primary Examiner* — Tuan C Dao
(74) *Attorney, Agent, or Firm* — Muncy, Geissler, Olds & Lowe, PC

(57) ABSTRACT

The present disclosure belongs to the technical field of information, provides a short-term interval prediction method for photovoltaic power output, and is a short-term interval prediction method for photovoltaic power output based on a combination of a multi-objective optimization algorithm and a least square support vector machine. The present disclosure firstly proposes a similar day classification method considering both numerical value and pattern similarity to enhance the regularity of samples, then constructs an adaptive proportional interval estimation model based on dual-LSSVM model, and optimizes model parameters by using NSGA-II algorithms to realize the interval prediction of photovoltaic power output. Results obtained by the method have high accuracy, and computation efficiency meets actual application requirements. The method can also be popularized and applied in the fields of grid connection and scheduling of renewable energy sources.

2 Claims, 6 Drawing Sheets

(56) References Cited

U.S. PATENT DOCUMENTS

| | | | |
|---|---|---|---|
| 2013/0212410 A1* | 8/2013 | Li | G06F 1/263 713/300 |
| 2014/0172503 A1* | 6/2014 | Hammerstrom | G06Q 30/0206 705/7.31 |
| 2017/0031056 A1* | 2/2017 | Vega-Avila | G06N 3/08 |
| 2019/0129959 A1 | 5/2019 | Jagwani et al. | |

OTHER PUBLICATIONS

First Notification of Office Action dated Oct. 12, 2020 in corresponding CN Application 202010173047.3, with English translation, 7 pages.

Notification to grant patent right for invention and Notification to Go through Formalities of Registration dated Nov. 5, 2020 in corresponding CN Application 202010173047.3, with English translation, 5 pages.

Certification of Patent for Invention dated Dec. 11, 2020 in corresponding CN Application 202010173047.3, with English translation, 4 pages.

Luo Mingwu, Sun Zhaoxia, et al, Electric Power Science and Engineering, Oct. 2015, pp. 44-49, vol. 31, No. 10.

Wang, S. and Zhang, N., Short-term photovoltaic power output prediction based on grey neural network combination model [J]. Automation of Electronic Power Systems. Oct. 10, 2021, pp. 31-41, vol. 36. No. 19.

Li, Y., Su, Y., Shu, L., ARMAX model for forecasting the power output of a grid connected photovoltaic system [J]. Renewable Energy, 2014, pp. 78-89, vol. 66.

Zhu, Y., Tian, J., Application of least square support vector machine in photovoltaic power Forcasting [J]. (2011). Power System Technology, pp. 54-59, vol. 35, No. 7.

Vaz, A. G. R., Elsinga, B., et al., An artificial neural network to assess the impact of neigh-bouring photovoltaic systems in power forecasting in Utrecht, the Netherlands[J].Renewable Energy, pp. 631-641 vol. 85.

Shan, Y., Fu, Q. et al., Combined prediction method of microgrid photovoltaic power generation based on improved BP-SVM-ELM and SOM-LSF with Particilization [J].(2016). Proceedings of the CSEE, Jun. 20, 2016, pp. 3334-3343, vol. 36, No. 12.

Ziadi, Z., Oshiro, M., et al., Optimal Voltage Control Using Inverters Interfaced With PV Systems Considering Forecast Error in a Distribution System[J]. IEEE Transactions on Sustainable Energy,Apr. 2014, pp. 682-690, vol. 5, No. 2.

Wan, C., Lin, J., Song, Y., et al. Probabilistic forecasting of photovoltaic generation: an efficient statistical approach [J]. IEEE Transactions on Power Systems, 2017, pp. 2471-2472, vol. 32, No. 3.

* cited by examiner

SHORT-TERM INTERVAL PREDICTION METHOD FOR PHOTOVOLTAIC POWER OUTPUT

TECHNICAL FIELD

The present disclosure belongs to the technical field of information, particularly relates to the technologies of clustering analysis, data-driven modeling and multi-objective optimization, and is a short-term interval prediction method for photovoltaic power output based on a combination of a multi-objective optimization algorithm and a least square support vector machine. The present disclosure firstly proposes a similar day classification method considering both numerical value and pattern similarity to enhance the regularity of samples, then constructs an adaptive proportional interval estimation model based on dual-LSSVM model, and optimizes model parameters by using NSGA-II algorithms to realize the interval prediction of photovoltaic power output. Results obtained by the method have high accuracy, and computation efficiency meets actual application requirements. The method can also be popularized and applied in the fields of grid connection and scheduling of renewable energy sources.

BACKGROUND

In recent years, renewable energy sources of wind energy, solar energy and biomass energy have been developed rapidly due to the advantages of cleanliness, no pollution and recyclable utilization, and have begun to replace non-renewable energy sources in more and more fields. The development of solar energy has increased rapidly; and photovoltaic power generation has fully entered the stage of scale development and presented a good development prospect. The photovoltaic power output is affected by many factors of illumination intensity, weather, temperature and humidity, and has strong randomness and large fluctuation and thus has strong uncertainty. Because a large-scale photovoltaic system after connected to a power grid has an impact on stability and safety of the power grid, the voltage fluctuation of the power grid is caused. (Chi Li. Research on modeling method of new energy processing time series based on fluctuation characteristics [D]. (2015). China Electric Power Research Institute). Therefore, accurate prediction of photovoltaic power output can help scheduling personnel to understand the load change of the system in advance, reduce the impact of photovoltaic grid-connection on the power grid and reduce the phenomenon of "light curtailment", so as to ensure continuous and stable operation of the power grid system.

For the prediction problem of photovoltaic power output, the methods in the existing literature are mostly prediction based on data points, mainly including grey theory (Shouxiang, Wang and Na Zhang. Short-term photovoltaic power output prediction based on grey neural network combination model [J]. (2011). Power system automation, 36(19): 37-41), time series model (Li Y, Su Y, Shu L. (2014). An ARMAX model for forecasting the power output of a grid connected photovoltaic system [J]. Renewable Energy, 2014, 66(6):78-89), support vector machine (Yongqiang, Zhu and Jun Tian. Application of least square support vector machine in photovoltaic power prediction [J]. (2011). Power grid technology, 35(7):54-59), neural network (Vaz A G R, Elsinga B, W. G. J. H. M. van Sark, et al. (2016). An artificial neural network to assess the impact of neigh-bouring photovoltaic systems in power forecasting in Utrecht, the Netherlands[J]. Renewable Energy, 85:631-641) and combined prediction method (Yinghao Shan, Qing Fu, Xuan Geng et al. Combined prediction method of microgrid photovoltaic power generation based on improved BP-SVM-ELM and particle SOM-LSF [J]. (2016). Proceedings of the CSEE, 36(12):3334-3343). However, the prediction model for data points ignores the uncertainty of photovoltaic power output in a bad weather environment, so the model accuracy will be reduced sharply in this case, and the reliability of the prediction results cannot be described. Interval prediction comprehensively considers the trend of the prediction results and the corresponding reliability evaluation, and is a more comprehensive prediction method. The interval prediction method for photovoltaic power output has been studied by some scholars. In recent years, methods based on extreme learning machine (ELM), (Wan Can, Lin Jin, Song Yonghua, et al. (2017). Probabilistic forecasting of photovoltaic generation: an efficient statistical approach[J]. IEEE Transactions on Power Systems, 32(3):2471-2472), set pair analysis theory (Mingyu Luo, Chaoxia Sun, Qiangmin Liu, et al. Interval prediction of solar irradiance based on set pair analysis theory. (2015). Electric Power Science and Engineering, 31 (10): 44-49) and parameter estimate (Cates C J, Oleszczuk M, et al. (2014). Optimal Voltage Control Using Inverters Interfaced With PV Systems Considering Forecast Error in a Distribution System[J]. IEEE Transactions on Sustainable Energy, 5(2):682-690 have been widely used for interval prediction. However, most of the above literature assumes that the photovoltaic power output obeys normal distribution or adopts a traditional neural network model, ignores distribution errors, and is difficult to avoid the defect that the neural network model is easy to fall into a local extreme value.

SUMMARY

To enhance prediction accuracy and reliability of photovoltaic power output, the present disclosure proposes an interval prediction model of an NSGA-II-based double least squares support vector machine (NSGA-II-DLSSVM). By considering the numerical similarity of influence factors of temperature, weather types and humidity and using Person correlation coefficient between the numerical similarity and photovoltaic power output as respective weight, a fuzzy C-means (FCM) clustering algorithm is used for clustering similar days in a sample set; and considering the pattern similarity of the sample set, clustering results are corrected based on Fre'chet distance. Thus, with respect to different similar day types, an interval prediction model based on dual LSSVMs is constructed, and model parameters are optimized by NSGA-II algorithm. The interval prediction model has high coverage probability and narrow interval width, and can provide more reliable guidance for scheduling of photovoltaic grid connection.

The technical solution of the present disclosure is:

A short-term interval prediction method for photovoltaic power output comprises steps of:

(1) Analyzing the correlation between the photovoltaic power output and the influencing factors by the Person correlation coefficient to eliminate the influencing factors with weak correlation and reduce data dimension; and taking the correlation coefficient between the factors and the photovoltaic power output as the influencing weight.

(2) Proposing a similar day division method based on FCM and discrete Fre'chet distance, and by considering both the numerical similarity and the pattern similarity of the data and combining the weight of the influencing factors, using the similar day division method to divide the sample set into multiple similar day sets to improve the prediction regularity and increase prediction accuracy.

(3) With respect to each similar day set, constructing the observation values of upper and lower limits of the interval based on the adaptive proportional interval estimation method, and directly conducting interval prediction in combination with the double least square interval prediction model.

(4) By taking the interval coverage probability and the average width of the interval as optimization objectives, using the improved NSGA-II multi-objective optimization algorithm to optimize the adaptive proportional interval estimation method and the parameters of the support vector machine to obtain the final interval prediction model.

The present disclosure has the beneficial effects: the interval prediction model of the present disclosure proposes the similar day division method combining FCM and discrete Fréchet distance, which improves the regularity of the samples. The proposed NSGA-II-DLSSVM interval prediction method effectively avoids the defect that a neural network model is easy to fall into a local extreme value. Through experimental verification of actual data, the method can obtain a narrower average width of the interval and a higher interval coverage probability under various similar day conditions, thereby providing more reliable support for the formulation of power scheduling solutions.

DESCRIPTION OF DRAWINGS

FIG. 4(*b*) shows a set of the second type of similar days after similar day division.

FIG. 4(*c*) shows a set of the third type of similar days after similar day division.

DETAILED DESCRIPTION

Figure 1:
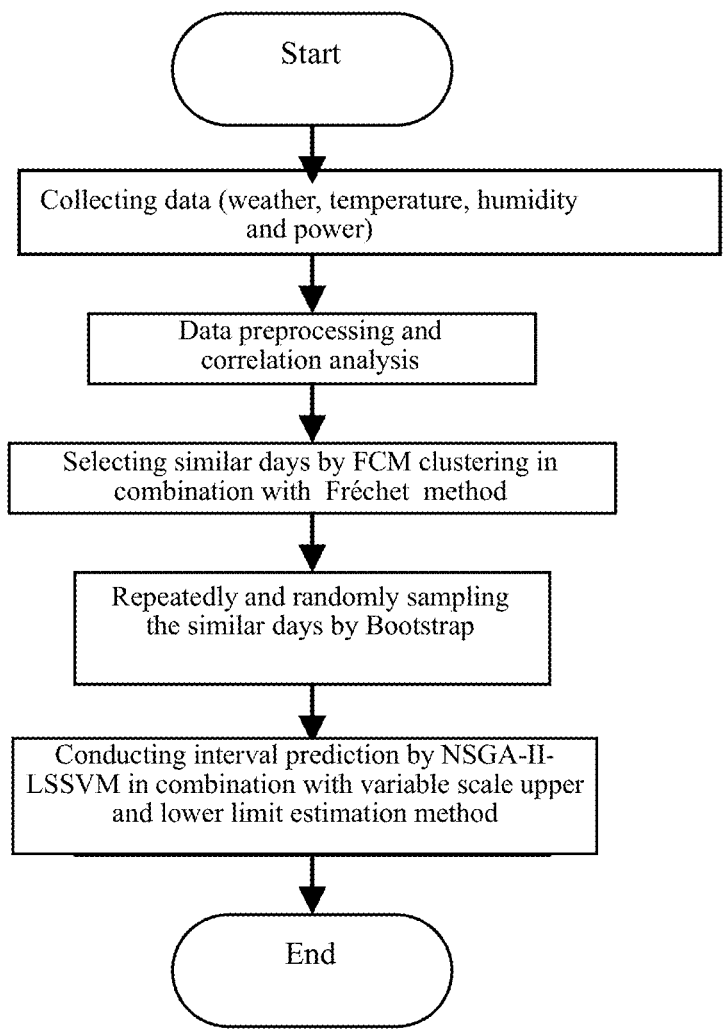
FIG. 1 is an application flow chart of the present disclosure.
Figure 2:
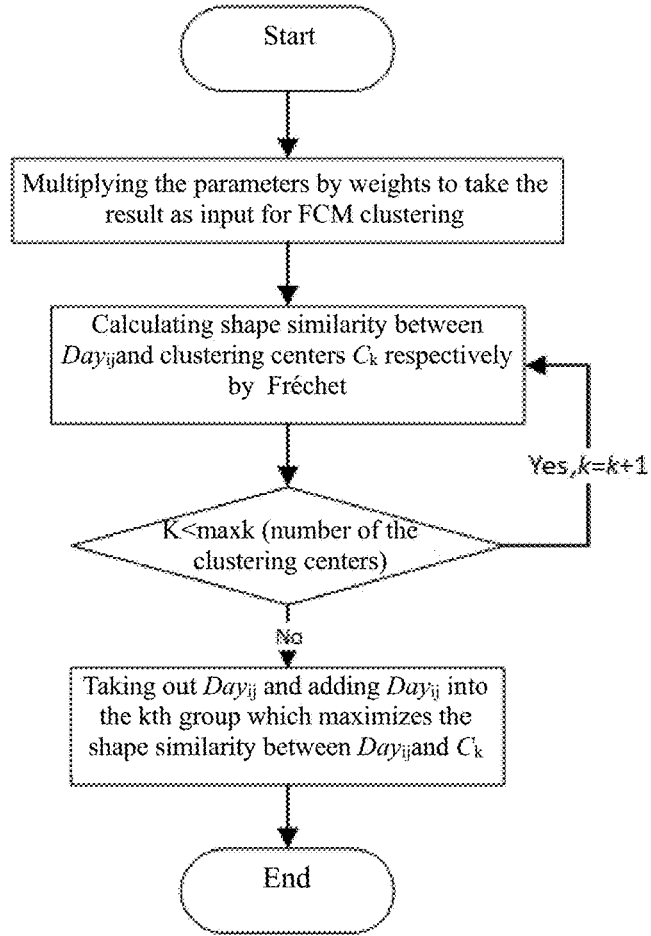
FIG. 2 shows a division process of similar days.
Figure 3:
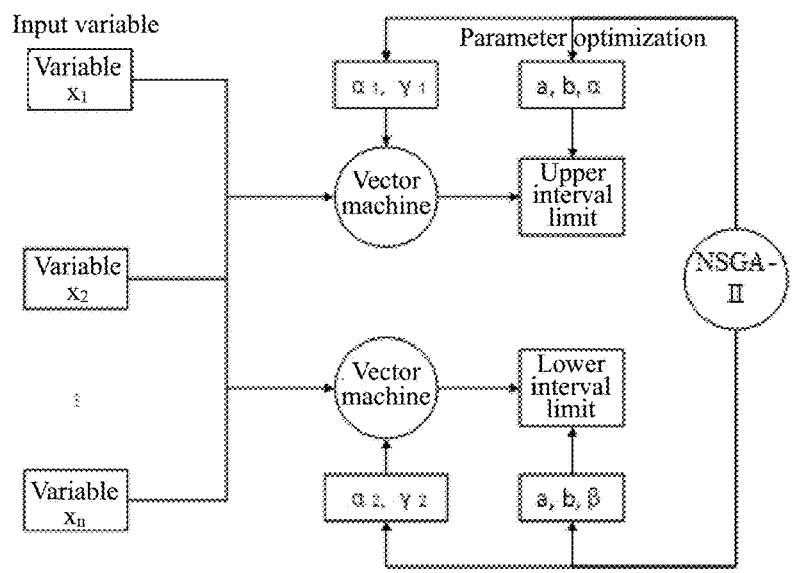
FIG. 3 shows an interval prediction process based on NSGA-II-LSSVM.
Figure 4A:
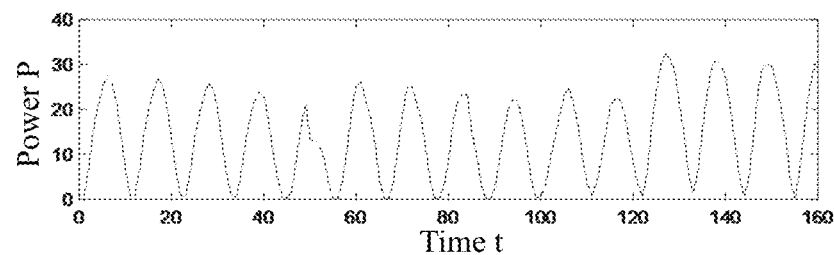
FIG. 4(*a*) shows a set of the first type of similar days after similar day division.
Figure 4B:
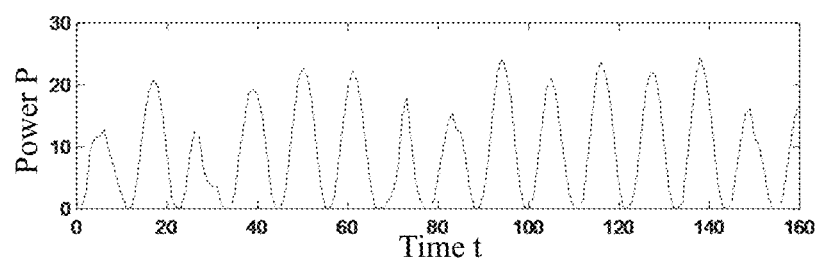
Figure 4C:
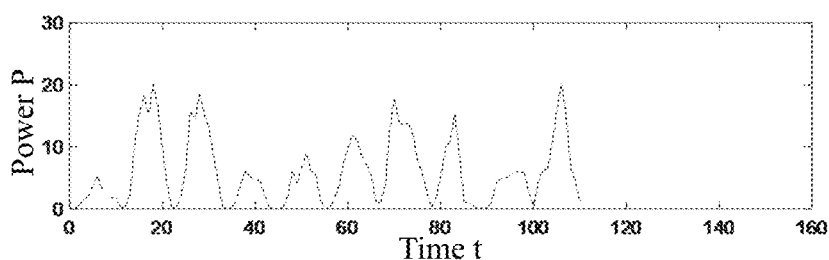

Photovoltaic power output is affected by many factors of solar radiation and temperature, which leads to the characteristics of intermittency and fluctuation of photovoltaic power output. At present, the installed capacity of photovoltaic power plants in China is large, but the photovoltaic power plants do not output power under dark conditions, and cannot provide stable power supplies separately to meet the load requirements of users, and the fluctuation is large in complex weather, which is easy to damage a power grid. The interval prediction of photovoltaic power output not only can be used for scheduling power resources and reducing resource waste, but also can predict fluctuation information, so as to weaken the fluctuation and reduce the damage to the power grid by means of stable power generation modes of thermal power. To better understand the technical route and implementation solution of the present disclosure, the method herein is applied to construct an interval prediction model based on the data of a domestic photovoltaic power plant. Specific implementation steps are as follows:

(1) Data preprocessing and correlation analysis

Because different noises are generated in the collection process of industrial data, the data needs to be cleaned firstly, and then the correlations of influencing factors on photovoltaic power output are analyzed to reduce the dimension of a sample set and improve the accuracy and computation efficiency of the model. Person correlation coefficient is generally used to measure the degree of correlation between two variables, and showing the form in formula (1):

$$r_{xy} = \frac{\sum_{i=1}^{n}(x_i - \overline{x})(y_i - \overline{y})}{\sqrt{\sum_{i=1}^{n}(x_i - \overline{x})^2}\sqrt{\sum_{i=1}^{n}(y_i - \overline{y})^2}} \quad (1)$$

wherein $x_i$ represents potential influencing factors of temperature and weather on day i, and $y_i$ is corresponding photovoltaic power output data. $\overline{x}$ and $\overline{y}$ respectively represent the average values of the influencing factors and photovoltaic power output in the data set. The method is used in the present disclosure to quantify the correlation between photovoltaic power output and potential factors of temperature, humidity and weather index.

(2) Similar day clustering

1) Numerical similarity

Based on the correlation analysis results of step (1), a sample set can be constructed, as shown in formula (2).

$$[r_{TP}\overline{T}; r_{HP}\overline{H}; r_{WP}\overline{W}] \quad (2)$$

wherein $\overline{T}$, $\overline{H}$ and $\overline{W}$ respectively represent average temperature, average humidity and weather index, and $r_{TP}$, $r_{HP}$, and $r_{WP}$, respectively represent correlation coefficients between temperature, humidity and weather factors and power. Formula (2) is clustered by FCM algorithm according to numerical similarity. The FCM algorithm obtains the membership of each sample point to all class centers by optimizing an objective function, and is a partition-based fuzzy clustering algorithm. The objective function is:

$$J(U, C) = \sum_{v=1}^{c} \sum_{t=1}^{N} u_{vt}^e d_{vt}^2 \qquad (3)$$

wherein $d_{vt}=\|z_v-s_t\|$ represents an Euclidean distance between the $t^{th}$ sample point $s_t$ and the $v^{th}$ clustering center $z_v$ in the sample set, e is a weighted index, $u_{vt}$ is the degree to which $s_t$ belongs to $z_v$, and N is the number of samples. Then, a constraint condition can be expressed in the form of formula (4):

$$\sum_{v=1}^{c} u_{vt} = 1, 0 \le u_{vt} \le 1, \forall t = 1, 2 \ldots N \qquad (4)$$

By introducing a Lagrange multiplier, the membership and the clustering center are calculated as shown in formulas (5) and (6):

$$z_v = \frac{\sum_{t=1}^{N} u_{vt}^e x_t}{\sum_{t=1}^{N} u_{vt}^e} \qquad (5)$$

$$u_{vt} = \frac{1}{\sum_{v=1}^{c} \left(\frac{d_{vt}}{d_{kt}}\right)^{2/e-1}} \qquad (6)$$

wherein $d_{kt}$ represents the euclidean distance between the $k^{th}$ clustering center and the $t^{th}$ sample point, and a calculation formula is $d_{kt}=\sqrt{(x_k-x_t)_2+(y_k-y_t)^2}$, wherein $x_k$ and $x_t$ are respectively the abscissa values of the $k^{th}$ clustering center and the $t^{th}$ sample point, and $y_k$ and $y_t$ are corresponding ordinate values respectively.

Then, the membership and the clustering center are updated through iteration, and the convergence of the clustering center is judged according to a given threshold. If the clustering center reaches the number of iterations or converges to the given threshold, the iteration is stopped, and multiple similar day sets and respective clustering centers are obtained.

2) Pattern similarity

Discrete Fre'chet distance is a description mode based on spatial path similarity, is mainly used to evaluate the similarity between two time series, and thus used to correct the clustering result. A formula is shown in (7):

$$D_F(L_1, L_2) = \max\begin{cases} \min\begin{cases} D_F\begin{pmatrix} \langle L_{1,1}, \ldots, L_{1,n-1}\rangle, \\ \langle L_{2,1}, \ldots, L_{2,m}\rangle \end{pmatrix} \\ D_F\begin{pmatrix} \langle L_{1,1}, \ldots, L_{1,n}\rangle, \\ \langle L_{2,1}, \ldots, L_{2,m-1}\rangle \end{pmatrix} \\ D_F\begin{pmatrix} \langle L_{1,1}, \ldots, L_{1,n-1}\rangle, \\ \langle L_{2,1}, \ldots, L_{2,m-1}\rangle \end{pmatrix} \end{cases} \\ d(L_{1,n}, L_{2,m}) \end{cases} \qquad (7)$$

wherein $D_F(L_1, L_2)$ represents the discrete Fre'chet distance between curves $L_1$ and $L_2$, $\langle L_{1,1}, \ldots L_{1,n}\rangle$ and $\langle L_{2,1}, \ldots, L_{2,m}\rangle$ represent ordered substrings composed of discrete points of $L_1$ and $L_2$, and n and m represent the lengths of $L_2$ and $L_1$ respectively. $d(L_{1,n}, L_{2,m})$ represents the Euclidean distance between $L_{1,n}$ and $L_{2,m}$. Formula (7) is solved by a recursive method. When two discrete substrings recurse to $\langle L_{1,1}\rangle$ and $\langle L_{2,1}\rangle$, the calculation is terminated. Then, $$D_F(\langle L_{1,1}\rangle, \langle L_{2,1}\rangle) = d(L_{1,1}, L_{2,1}) \qquad (8)$$

A similar day correction formula based on the discrete Fre'chet distance is shown in formula (9):

$$D = \min(D_F(\text{Day}_{pq}, c_1), \ldots, D_F(\text{Day}_{pq}, c_d)) \qquad (9)$$

wherein $D_F(\text{Day}_{pq}, c_n)$ represents the discrete Fre'chet distance between a sample day q and class d clustering center in class p similar day weather, and D is a minimum value of all discrete Fre'chet distances. When $D=D_F(\text{Day}_{pq},c_d)$, $p \neq d$, this indicates that the pattern similarity between the sample day q and the class d weather clustering center of the class p similar day weather is maximal and can be added to the class d similar day weather. All similar days are corrected by the method, and the result after correction is a similar day division result.

(3) Construction of sample observation values based on an adaptive scale coefficient interval estimation method A prediction sample set is constructed, and an input and an output of the prediction sample set are shown in formula (10) and formula (11):

$$[t'_h, T_h, H'_h, W_h, T_{h+1}, H'_{h+1}, W_{h+1}] \qquad (10)$$

$$[H_{h+1}, L_{h+1}] \qquad (11)$$

wherein t' is time, T is temperature, H' is humidity and W is a weather type index. h and h+1 respectively represent a current time and a prediction time, and $H_{h+1}$ and $L_{h+1}$ are respectively upper and lower limits of a prediction interval at h+1 time. Because the sample set lacks observation values of the upper and lower limits of the photovoltaic power output interval, a variable scale coefficient is constructed to determine the observation values. A specific formula is shown in formula (12):

$$\begin{cases} H_g = (1 + \alpha(a + bk'))P_g \\ L_g = (1 - \beta(a + bk'))P_g \end{cases} \qquad (12)$$

wherein $\alpha$ and $\beta$ are fixed upper limit scale factor and lower limit scale factor; a+bk' is a penalty function; a and b are constants; k' is a penalty factor, which can be expressed as formula 13:

$$k' = \frac{\overline{P}}{P_g} \qquad (13)$$

wherein $\overline{P}$ is an average power value of the observed samples, and $P_g$ is a corresponding power value at g time. $\alpha$, $\beta$, a and b values are obtained by NSGA-II multi-objective optimization algorithm. The penalty factor k' can dynamically adjust the scale of the upper and lower limits of the interval according to the power amplitude.

(4) Construction of the interval prediction model based on NSGA-II-DLSSVM method step 1: randomly initializing M populations, and each population comprising a set of parameters: $\alpha$, $\beta$, a, b, $\sigma_1$, $\gamma_1$, $\sigma_2$ and $\gamma_2$, wherein $\sigma_1$ and $\gamma_1$ are the parameters of a vector machine 1, $\sigma_2$ and $\gamma_2$ are the parameters of a vector machine 2, and other parameters are the parameters of the estimation method of the upper and lower limits of the variable scale interval in formula (12);

step 2: substituting initialization parameters into the model, and obtaining the upper and lower limits of interval prediction by training samples based on DLSSVM combined with the estimation method of the upper and lower limits of the variable scale interval;

step 3: calculating the function values of two objectives of interval coverage probability and average width according to prediction results, wherein the interval coverage probability represents the proportion or probability that actual data are distributed in the prediction interval, and the size of the probability is one of important indexes to determine the accuracy of interval prediction, and a formula is shown as follows:

$$P_{IC} = \frac{1}{K}\sum_{r=1}^{K} a_r \times 100\% \quad (14)$$

wherein $P_{IC}$ represents the interval coverage probability; K represents the number of the samples; the value of $a_r$ is 0 or 1; if a target value $y_r$ of the $r^{th}$ sample is in the prediction interval, $a_r$ is 1; otherwise, $a_r$ is 0; and a definition is shown in formula (15):

$$a_r = \begin{cases} 0, y_r \notin [L_r, H_r] \\ 1, y_r \in [L_r, H_r] \end{cases} \quad (15)$$

the average width of the interval is used as another interval prediction index to improve interval prediction quality. The expression of the average width of the interval is:

$$W_I = \frac{1}{KR}\sum_{l=1}^{K}(H_l - L_l) \quad (16)$$

wherein $W_I$ represents the average width of the interval; $H_l$ and $L_l$ respectively represent the upper limit and the lower limit of interval prediction at l time; and R is a range of the upper limit and the lower limit of the prediction interval, and is used to normalize $W_I$;

step 4: sorting an objective function solution corresponding to each individual in the populations based on improved fast non-dominated sorting to reduce sorting complexity and shorten sorting time;

step 5: calculating and sorting congestion for the individuals in the same layer after non-dominated sorting, and reserving good individuals in a parent generation by an elitist retention strategy;

step 6: copying, crossing and mutating parent and son and merging, and updating the population parameters;

step 7: repeating steps 2-6 until the number of iterations reaches a set number or the model performance improvement is less than the given threshold.

The improved fast non-dominated sorting method in step 4 comprises three substeps of:

a) calculating the number $n_w$ of individuals in dominated individuals of the population $P_C$ and a corresponding set $S_w$, and reserving only the individuals with $n_w$ less than 4 to reduce the number of non-dominated layers;

b) dividing the population into $n_w+1$ non-dominated layers, the number of layers in which the individuals are located being equal to $n_w+1$, and recording the set of the individuals in the $k_w$ layer as $F_{kw}$;

c) if $S_w \in F_1$, moving the individuals in the third layer and the fourth layer to the second layer: if $S_w \in F_2$, moving the individuals in the fourth layer to the third layer: at this point, fast non-dominated sorting is completed, and time complexity of the improved non-dominated sorting is $O(n_w^2)$.

Figure 5:
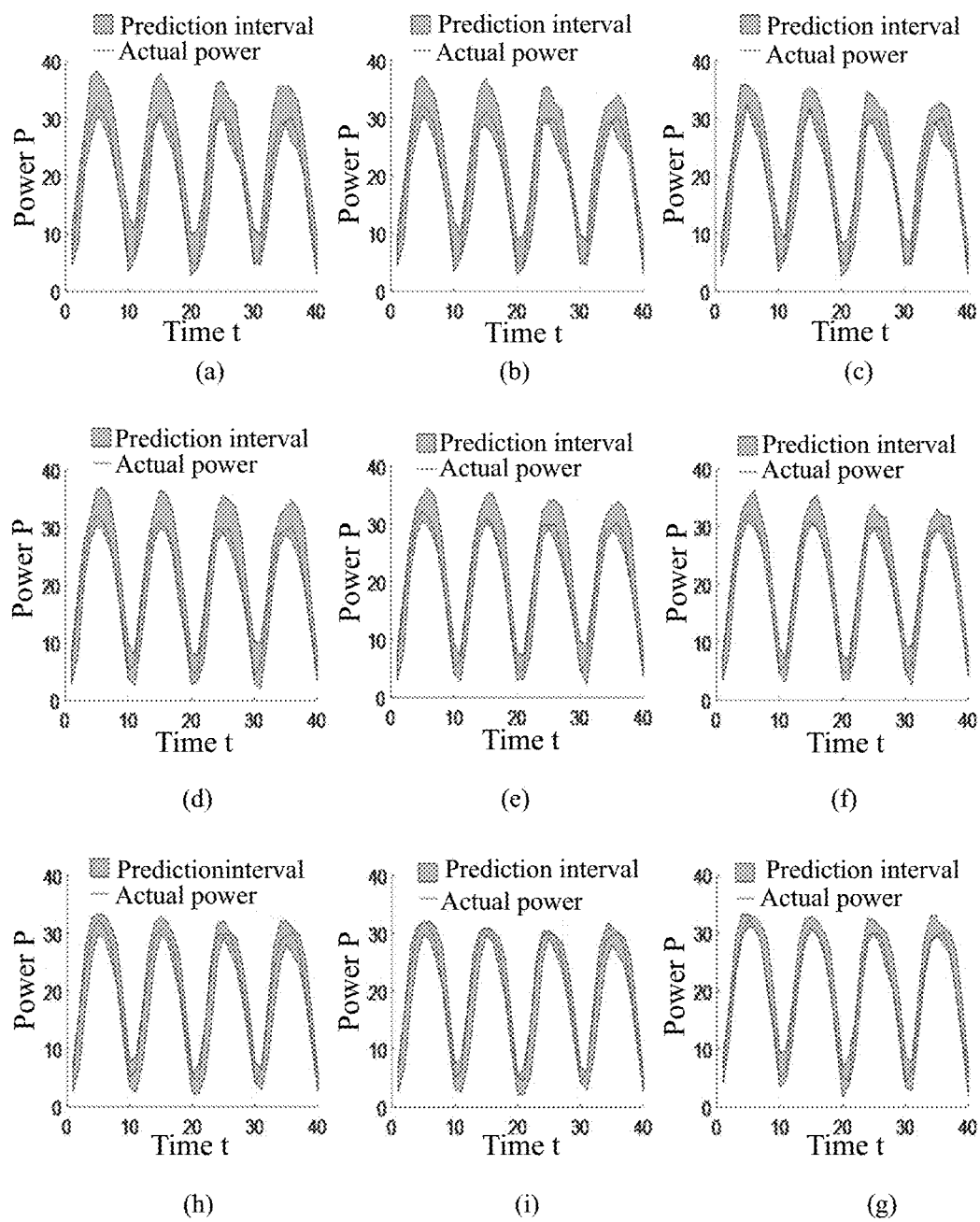
FIG. 5 shows comparison diagrams of interval prediction effects of three methods under the weather of the first type of similar days, wherein (a) is method a and confidence level is 95%; (b) is method a and confidence level is 90%; (c) is method a and confidence level is 85%; (d) is method b and confidence level is 95%; (e) is method b and confidence level is 90%; (f) is method b and confidence level is 85%; (g) is the present disclosure and confidence level is 95%; (h) is the present disclosure and confidence level is 90%; (i) is the present disclosure and confidence level is 85%.
Figure 6:
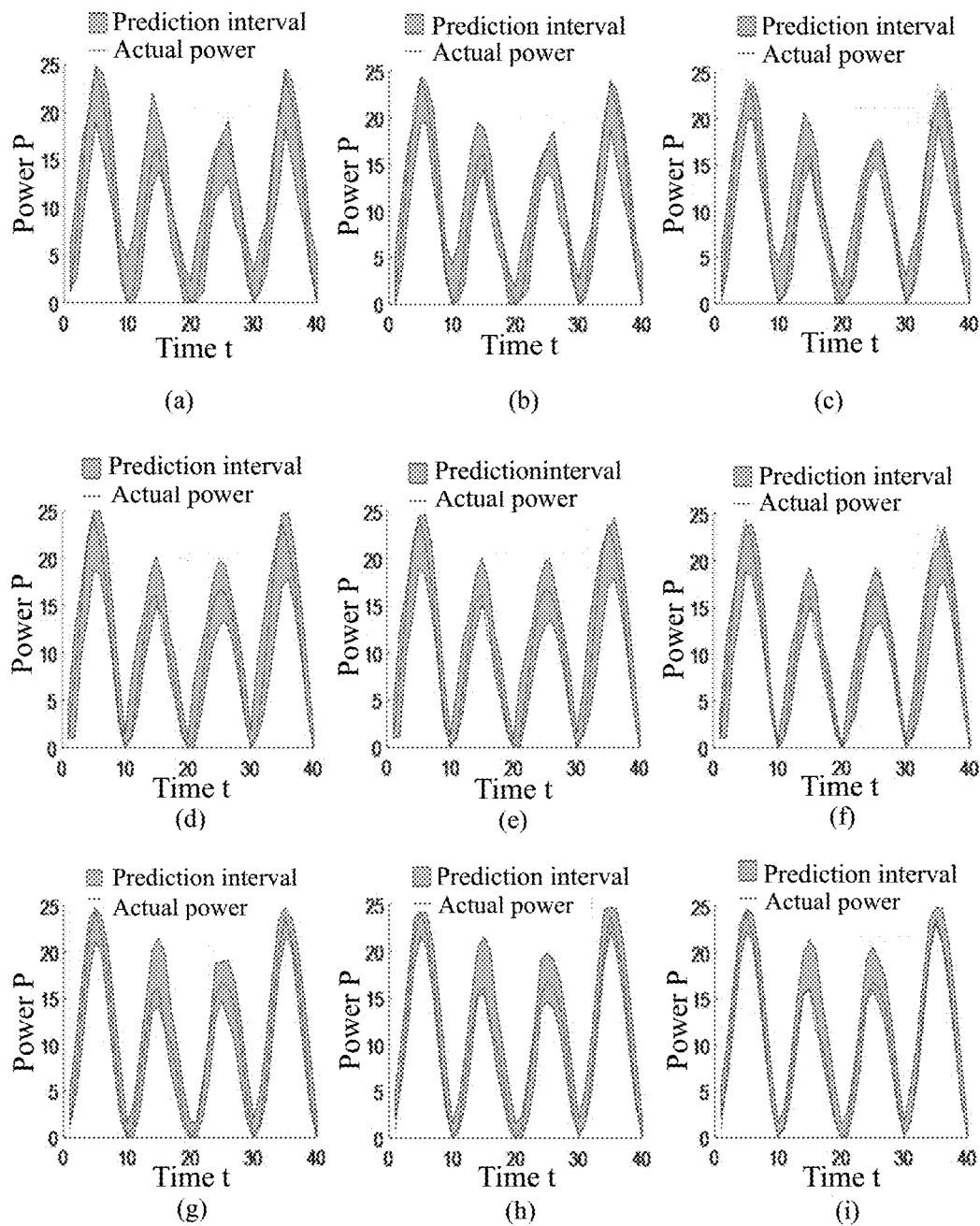
FIG. 6 shows comparison diagrams of interval prediction effects of three methods under the weather of the second type of similar days, wherein (a) is method a and confidence level is 95%; (b) is method a and confidence level is 90%; (c) is method a and confidence level is 85%; (d) is method b and confidence level is 95%; (e) is method b and confidence level is 90%; (f) is method b and confidence level is 85%; (g) is the present disclosure and confidence level is 95%; (h) is the present disclosure and confidence level is 90%; (i) is the present disclosure and confidence level is 85%.
Figure 7:
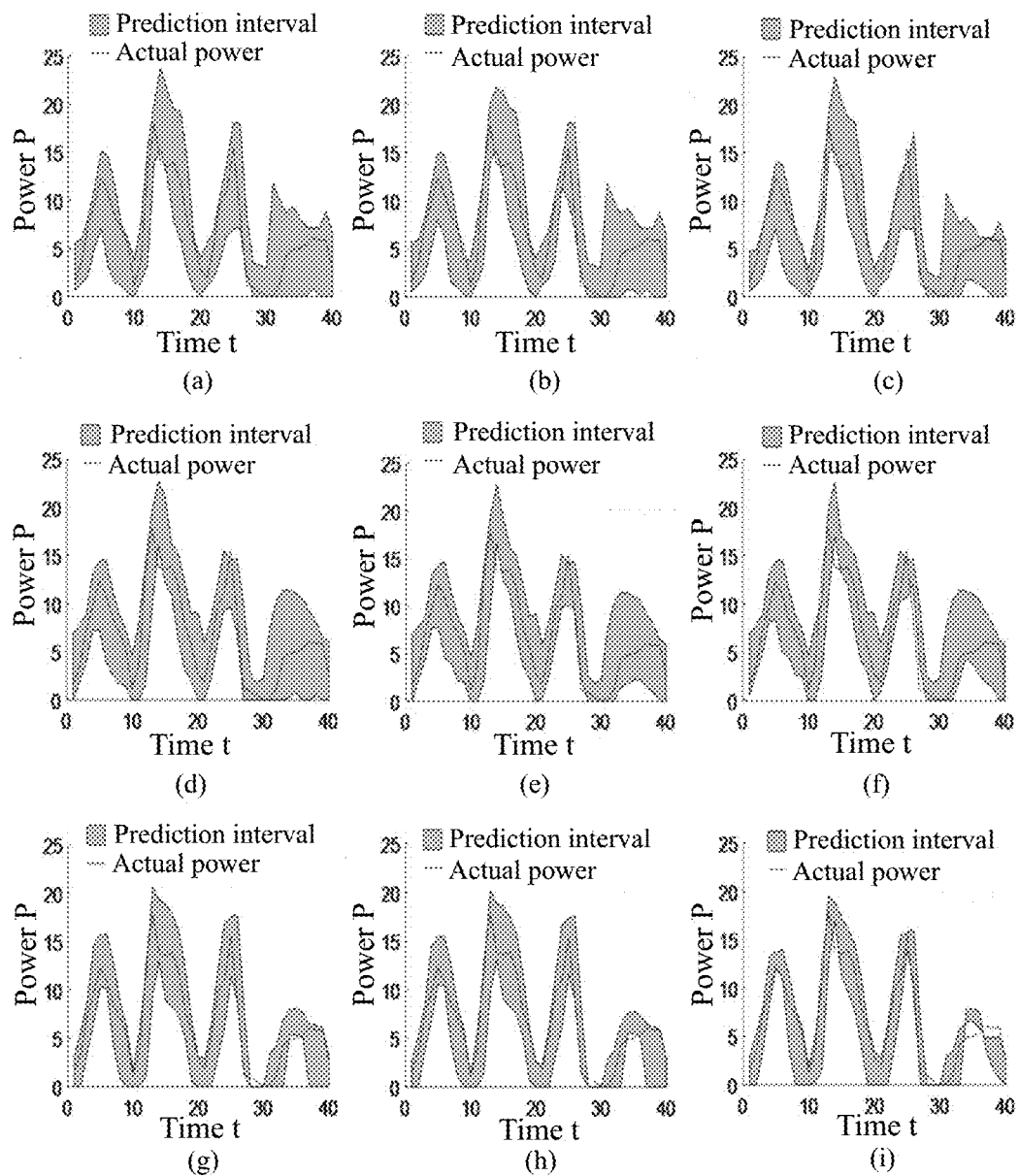
FIG. 7 shows comparison diagrams of interval prediction effects of three methods under the weather of the third type of similar days, wherein (a) is method a and confidence level is 95%; (b) is method a and confidence level is 90%; (c) is method a and confidence level is 85%; (d) is method b and confidence level is 95%; (e) is method b and confidence level is 90%; (f) is method b and confidence level is 85%; (g) is the present disclosure and confidence level is 95%; (h) is the present disclosure and confidence level is 90%; (i) is the present disclosure and confidence level is 85%.

The validity of the proposed method is verified through the actual data of a photovoltaic power station in a domestic park from November 2017 to April 2018. Sampling time is 8:00 to 18:00 every day, and a sampling interval is 1 hour. The sample sets are classified into three categories by a proposed similar day division model. Based on the NSGA-II-DLSSVM interval prediction model, three groups of similar day data sets are trained respectively, and three groups of optimal solution sets including the interval prediction model parameters and the corresponding objective functions are obtained. The coverage probability is taken as a confidence level, and different confidence levels (95%, 90% and 85%) are selected to conduct interval prediction on three types of similar days; and weather after the use of the similar day division method herein is subjected to interval prediction by using a particle swarm optimization (PSO)-based BP neural network interval prediction method (PSO-BP-LUBE, method a) and an improved PSO-based extreme learning machine interval prediction method (W-PSO-ELUBE, method b), as contrast experiments, as shown in FIG. 5-FIG. 7. The prediction effects of three methods are evaluated by using the prediction interval coverage probability (PIC) and the average width of interval (WI) proposed by formulas (14) and (16) as evaluation indexes. The results of the contrast experiments are shown in Table 1 Table 2 ad Table 3:

TABLE I

Comparison of Interval Prediction Results of Different Methods on the First Type of Similar Days

| Method Comparison | Confidence Level 95% | | Confidence Level 90% | | Confidence Level 85% | |
|---|---|---|---|---|---|---|
| | $P_{IC}$/% | $W_I$/% | $P_{IC}$/% | $W_I$/% | $P_{IC}$/% | $W_I$/% |
| Method a | 92.5 | 21.9 | 87.5 | 19.5 | 82.5 | 18.3 |
| Method b | 97.5 | 20.8 | 92.5 | 18.6 | 85 | 16.1 |
| The present disclosure | 100 | 17.7 | 95 | 15.9 | 87.5 | 14.3 |

It can be seen from Table 1 that the interval prediction effects of photovoltaic power output under the weather of the first type of similar days are generally good for the following reasons: the first type of similar days are mostly sunny days, solar radiation in the similar period of time presents periodic change and is slightly blocked, illumination intensity on the surface and the temperature and humidity of the surface are relatively stable in the sunny days, and the photovoltaic power output has strong regularity and weak randomness. The present disclosure can reach 100% coverage probability and 17.7% average width at the confidence level 95%. Through comparison, it is found that the interval prediction effects of the present disclosure under different confidence levels are obviously better than the effects of other two methods.

TABLE 2

Comparison of Interval Prediction Results of Different Methods on the Second Type of Similar Days

| Method | Confidence Level 95% | | Confidence Level 90% | | Confidence Level 85% | |
|---|---|---|---|---|---|---|
| Comparison | $P_{IC}$/% | $W_I$/% | $P_{IC}$/% | $W_I$/% | $P_{IC}$/% | $W_I$/% |
| Method a | 92.5 | 72.7 | 90 | 21.1 | 82.5 | 19.2 |
| Method b | 97.5 | 22.1 | 9 | 20.9 | 82.5 | 18.7 |
| The present disclosure | 97.5 | 19.2 | 92.5 | 17.1 | 87.5 | 15.2 |

It can be seen from Table 2 that the prediction effects of three interval prediction methods on the second type of similar days are reduced; the second type of similar days are mostly cloudy days, solar radiation is blocked to a certain degree and the weather conditions have weak regularity compared with the sunny days, leading to the reduction of the regularity of photovoltaic power output. Although the performance of the interval prediction method herein is reduced, the prediction effects are still better than the other two methods.

TABLE 3

Comparison of Interval Prediction Results of Different Methods on the Third Type of Similar Days

| Method | Confidence Level 95% | | Confidence Level 90% | | Confidence Level 85% | |
|---|---|---|---|---|---|---|
| Comparison | $P_{IC}$/% | $W_I$/% | $P_{IC}$/% | $W_I$/% | $P_{IC}$/% | $W_I$/% |
| Method a | 95 | 37.4 | 87.5 | 34.1 | 82.5 | 29.9 |
| Method b | 95 | 36.7 | 90 | 33.7 | 82.5 | 28.8 |
| The present disclosure | 95 | 30.8 | 90 | 28.2 | 85 | 25.3 |

It can be seen from Table 3 that the effects of three interval prediction methods under the conditions of the third type of similar days are generally poor; and at confidence level 95%, the average width of the three methods is more than 30% because the illumination intensity, temperature and humidity at the surface fluctuate strongly under complex weather, leading to poor regularity of photovoltaic power output. However, the method herein can still maintain a lower average width and a higher coverage probability.

It can be seen through comparison that the method herein can ensure a higher interval coverage probability and a lower average width, and has better interval prediction performance than the other two methods under the weather conditions of three types of similar days. Meanwhile, the method herein can still provide relatively accurate interval prediction under complex weather conditions.

The invention claimed is:

1. A short-term interval prediction method for photovoltaic power output, comprising steps of:

(1) data preprocessing and correlation determination cleaning collected industrial data firstly, and then analyzing the correlations of influencing factors on photovoltaic power output to reduce the dimension of a sample set and improve the accuracy and computation efficiency of a model; using Person correlation coefficient to measure the degree of correlation between two variables, and the form is shown in formula (1):

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

wherein $x_i$ represents potential influencing factors of temperature and weather on day i, and $y_i$ is corresponding photovoltaic power output data; $\bar{x}$ and $\bar{y}$ respectively represent the average values of the influencing factors and photovoltaic power output in the data set; the method is used to quantify the correlation between photovoltaic power output and potential factors of temperature, humidity and weather index;

(2) similar day clustering 1) numerical similarity based on the correlation analysis results of step (1), constructing a sample set as shown in formula (2):

$$[r_{TP}\overline{T}; r_{HP}\overline{H}; r_{WP}\overline{W}] \quad (2)$$

wherein $\overline{T}$, $\overline{H}$ and $\overline{W}$ respectively represent average temperature, average humidity and weather index, and $r_{TP}$, $r_{HP}$ and $r_{WP}$ respectively represent correlation coefficients between temperature, humidity and weather factors and power; formula (2) is clustered by FCM algorithm according to numerical similarity; the FCM algorithm obtains the membership of each sample point to all class centers by optimizing an objective function, and is a partition-based fuzzy clustering algorithm; the objective function is:

$$J(U, C) = \sum_{v=1}^{c}\sum_{t=1}^{N} u_{vt}^{e} d_{vt}^{2} \quad (3)$$

wherein $d_{vt} = \|z_v - s_t\|$ represents an Euclidean distance between the $t^{th}$ sample point $s_t$ and the $v^{th}$ clustering center $z_v$ in the sample set, e is a weighted index, $u_{vt}$ is the degree to which $s_t$ belongs to $z_v$, and N is the number of samples; then, a constraint condition is expressed in the form of formula (4):

$$\sum_{v=1}^{c} u_{vt} = 1, 0 \le u_{vt} \le 1, \forall t = 1, 2 \ldots N \quad (4)$$

by introducing a Lagrange multiplier, calculating the membership and the clustering center as shown in formulas (5) and (6):

$$z_v = \frac{\sum_{t=1}^{N} u_{vt}^e x_t}{\sum_{t=1}^{N} u_{vt}^e} \quad (5)$$

$$u_{vt} = \frac{1}{\sum_{k=1}^{c} \left(\frac{d_{vt}}{d_{kt}}\right)^{2/e-1}} \quad (6)$$

then, updating the membership and the clustering center through iteration, and judging the convergence of the clustering center according to a given threshold; if the clustering center reaches the number of iterations or converges to the given threshold, stopping the iteration, and obtaining multiple similar day sets and respective clustering centers;

2) pattern similarity discrete Fre'chet distance is a description mode based on spatial path similarity, is used to evaluate the similarity between two time series, and thus used to correct the clustering result; a formula is shown in (7):

$$D_F(L_1, L_2) = \max \begin{cases} \min \begin{cases} D_F\begin{pmatrix} \langle L_{1,1}, \ldots, L_{1,n-1} \rangle, \\ \langle L_{2,1}, \ldots, L_{2,m} \rangle \end{pmatrix}, \\ D_F\begin{pmatrix} \langle L_{1,1}, \ldots, L_{1,n} \rangle, \\ \langle L_{2,1}, \ldots, L_{2,m-1} \rangle \end{pmatrix}, \\ D_F\begin{pmatrix} \langle L_{1,1}, \ldots, L_{1,n-1} \rangle, \\ \langle L_{2,1}, \ldots, L_{2,m-1} \rangle \end{pmatrix} \end{cases} \\ d(L_{1,n}, L_{2,m}) \end{cases} \quad (7)$$

wherein $D_F(L_1, L_2)$ represents the discrete Fre'chet distance between curves $L_1$ and $L_2$, $\langle L_{1,1}, \ldots L_{1,n} \rangle$ and $\langle L_{2,1}, \ldots L_{2,m} \rangle$ represent ordered substrings composed of discrete points of $L_1$ and $L_2$, and n and m represent the lengths of $L_2$ and $L_1$ respectively; $d(L_{1,n}, L_{2,m})$ represents the Euclidean distance between $L_{1,n}$ and $L_{2,m}$; formula (7) is solved by a recursive method; when two discrete substrings recurse to $\langle L_{1,1} \rangle$ and $\langle L_{2,1} \rangle$, the calculation is terminated; then, $$D_F(\langle L_{1,1} \rangle, \langle L_{2,1} \rangle) = d(L_{1,1}, L_{2,1}) \quad (8)$$

a similar day correction formula based on the discrete Fre'chet distance is shown in formula (9):

$$D = \min(D_F(Day_{pq}, c_1), \ldots, D_F(Day_{pq}, c_d)) \quad (9)$$

wherein $D_F(Day_{pq}, c_n)$ represents the discrete Fre'chet distance between a sample day q and class d clustering center in class p similar day weather, and D is a minimum value of all discrete Fre'chet distances; when $D = D_F(Day_{pq}, c_d)$, $p \ne d$, this indicates that the pattern similarity between the sample day q and the class d weather clustering center of the class p similar day weather is maximal and is added to the class d similar day weather; all similar days are corrected by the method, and the result after correction is a similar day division result;

(3) construction of sample observation values based on an adaptive scale coefficient interval estimation method constructing a prediction sample set, and showing an input and an output of the prediction sample set in formula (10) and formula (11):

$$[t'_h, T_h, H'_h, W_h, T_{h+1}, H'_{h+1}, W_{h+1}] \quad (10)$$

$$[H_{h+1}, L_{h+1}] \quad (11)$$

wherein t' is time, T is temperature, H' is humidity and W is a weather type index; h and h+1 respectively represent a current time and a prediction time, and $H_{h+1}$ and $L_{h+1}$ are respectively upper and lower limits of a prediction interval at h+1 time; because the sample set lacks observation values of the upper and lower limits of the photovoltaic power output interval, a variable scale coefficient is constructed to determine the observation values; a specific formula is shown in formula (12):

$$\begin{cases} H_g = (1 + \alpha(a + bk'))P_g \\ L_g = (1 - \beta(a + bk'))P_g \end{cases} \quad (12)$$

wherein $\alpha$ and $\beta$ are fixed upper limit scale factor and lower limit scale factor; a+bk' is a penalty function; a and b are constants; k' is a penalty factor, which is expressed as formula (13):

$$k' = \frac{\bar{P}}{P_g} \quad (13)$$

wherein $\bar{P}$ is an average power value of the observed samples, and $P_g$ is a corresponding power value at g time; $\alpha$, $\beta$, a and b values are obtained by NSGA-II multi-objective optimization algorithm; the penalty factor k' dynamically adjusts the scale of the upper and lower limits of the interval according to the power amplitude;

(4) construction of the interval prediction model based on NSGA-II-DLSSVM method step 1: randomly initializing M populations, and each population comprising a set of parameters: a, β, a, b, $\sigma_1$, $\gamma_1$, $\sigma_2$ and $\gamma_2$, wherein $\sigma_1$ and $\gamma_1$ are the parameters of a vector machine 1, $\sigma_2$ and $\gamma_2$ are the parameters of a vector machine 2, and other parameters are the parameters of the estimation method of the upper and lower limits of the variable scale interval in formula (12);

step 2: substituting initialization parameters into the model, and obtaining the upper and lower limits of interval prediction by training samples based on DLSSVM combined with the estimation method of the upper and lower limits of the variable scale interval;

step 3: calculating the function values of two objectives of interval coverage probability and average width according to prediction results, wherein the interval coverage probability represents the proportion or probability that actual data are distributed in the prediction interval, and the size of the probability is one of important indexes to determine the accuracy of interval prediction, and a formula is shown as follows:

$$P_{IC} = \frac{1}{K}\sum_{r=1}^{K} a_r \times 100\% \qquad (14)$$

wherein $P_{IC}$ represents the interval coverage probability; K represents the number of the samples; the value of $a_r$ is 0 or 1; if a target value $y_r$ of the $r^{th}$ sample is in the prediction interval, $a_r$ is 1; otherwise, $a_r$ is 0; and a definition is shown in formula (15):

$$a_r = \begin{cases} 0, y_r \notin [L_r, H_r] \\ 1, y_r \in [L_r, H_r] \end{cases} \qquad (15)$$

the average width of the interval is used as another interval prediction index to improve interval prediction quality; the expression of the average width of the interval is:

$$W_I = \frac{1}{KR}\sum_{l=1}^{K} (H_l - L_l) \qquad (16)$$

wherein $W_I$ represents the average width of the interval; $H_l$ and $L_l$ respectively represent the upper limit and the lower limit of interval prediction at l time; and R is a range of the upper limit and the lower limit of the prediction interval, and is used to normalize $W_I$;

step 4: sorting an objective function solution corresponding to each individual in the populations based on improved fast non-dominated sorting to reduce sorting complexity and shorten sorting time;

step 5: calculating and sorting congestion for the individuals in the same layer after non-dominated sorting, and reserving good individuals in a parent generation by an elitist retention strategy;

step 6: copying, crossing and mutating parent and son and merging, and updating the population parameters;

step 7: repeating steps 2-6 until the number of iterations reaches a set number or the model performance improvement is less than the given threshold.

2. The short-term interval prediction method for photovoltaic power output according to claim 1, wherein the improved fast non-dominated sorting method in step 4 comprises three substeps of:

a) calculating the number $n_w$ of individuals in dominated individuals of the population $P_C$ and a corresponding set $S_w$, and reserving only the individuals with $n_w$ less than 4 to reduce the number of non-dominated layers;

b) dividing the population into $n_w+1$ non-dominated layers, the number of layers in which the individuals are located being equal to $n_w+1$, and recording the set of the individuals in the $k_w$ layer as $F_{kw}$;

c) if $S_w \in F_1$, moving the individuals in the third layer and the fourth layer to the second layer; if $S_w \in F_2$, moving the individuals in the fourth layer to the third layer; at this point, fast non-dominated sorting is completed, and time complexity of the improved non-dominated sorting is $O(n_w^2)$.

* * * * *